United States Patent
Shah

(10) Patent No.: US 10,104,672 B2
(45) Date of Patent: Oct. 16, 2018

(54) METHOD AND A SYSTEM FOR IDENTIFYING OPERATING MODES OF COMMUNICATIONS IN MOBILE EDGE COMPUTING ENVIRONMENT

(71) Applicant: Wipro Limited, Bangalore (IN)

(72) Inventor: Vikas Shah, Phoenixville, PA (US)

(73) Assignee: Wipro Limited, Bangalore (IN)

( * ) Notice: Subject to any disclaimer, the term of this patent is extended or adjusted under 35 U.S.C. 154(b) by 44 days.

(21) Appl. No.: 15/232,578

(22) Filed: Aug. 9, 2016

(65) Prior Publication Data

US 2018/0049179 A1 Feb. 15, 2018

(51) Int. Cl.
| | |
|---|---|
| *H04L 12/28* | (2006.01) |
| *H04W 72/04* | (2009.01) |
| *H04L 29/08* | (2006.01) |
| *H04W 4/38* | (2018.01) |
| *H04J 1/00* | (2006.01) |

(52) U.S. Cl.
CPC .......... *H04W 72/048* (2013.01); *H04L 67/12* (2013.01); *H04W 4/38* (2018.02)

(58) Field of Classification Search
USPC .......... 370/352, 392, 401, 390, 395.53, 235, 370/254, 400, 409, 230, 236, 252, 389, 370/391, 393, 395.5, 466, 467, 473, 486, 370/535
See application file for complete search history.

(56) References Cited

U.S. PATENT DOCUMENTS

2017/0048876 A1* 2/2017 Mahindra ........... H04W 72/087

OTHER PUBLICATIONS

Bieler, Dan, "Mobile Edge Computing Will Be Critical for Internet-of-Things Success", Jun. 1, 2016,, Retrieved From: https://www.forrester.com/report/Mobile+Edge+Computing+Will+Be+Critical+for+InternetOfThings+Success/-/E-RES132019, webstie, Forrester Research, Inc.
Ahmed, Arif et al., "A Survey on Mobile Edge Computing", Publication, Jan. 2016, Retrieved From: https://www.researchgate.net/publication/285765997_A_Survey_on_Mobile_Edge_Computing, website, researchgate.net.
(Continued)

*Primary Examiner* — Phuongchau Ba Nguyen
(74) *Attorney, Agent, or Firm* — LeClairRyan PLLC

(57) ABSTRACT

A method for communication between one or more IoT sensor nodes associated with one or more IoT sensor devices, and one or more mobile edge computing (MEC) devices associated with one or more edge users is disclosed. The method comprises defining, by a mobile edge computing (MEC) server, one or more business verticals and one or more dimensions associated with each of the one or more business verticals. The method further comprises identifying, by the MEC server, one or more operating modes associated with the one or more IoT sensor nodes based on the one or more dimensions, wherein each of the one or more operating modes are associated with one or more communication channels. The method further comprises receiving, by the MEC server, information captured by the one or more IoT sensor nodes based on the one or more operating modes, via the associated one or more communication channels.

20 Claims, 6 Drawing Sheets

(56) References Cited

OTHER PUBLICATIONS

Hu, Yun Chao et al., "Mobile Edge Computing A Key Technology Towards 5G", Sep. 2015, pp. 1-16, First Edition, No. 11, Retrieved From: http://www.etsi.org/images/files/ETSIWhitePapers/etsi_wp11_mec_a_key_technology_towards_5g.pdf, website, European Telecommunications Standards Institute.

Jaradat, Manar et al., "The Internet of Energy: Smart Sensor Networks and Big Data Management for Smart Grid", Publication, Jun. 25, 2015, Retrieved From: https://www.researchgate.net/publication/279176954_The_Internet_of_Energy_Smart_Sensor_Networks_and_Big_Data_Management_for_Smart_Grid, website, The Authors. Published by Elsevier B.V.

* cited by examiner

FIG. 1: Mobile Edge Computing (MEC) Environment 100

FIG. 2: Mobile Edge Computing (MEC) framework 200

FIG. 3: Mobile Edge Computing (MEC) Server 106

FIG. 5: Example Computer System

METHOD AND A SYSTEM FOR IDENTIFYING OPERATING MODES OF COMMUNICATIONS IN MOBILE EDGE COMPUTING ENVIRONMENT

FIELD

The present subject matter is related, in general to communication systems, and more particularly, but not exclusively to a method and a system for identifying operating modes of communications in a mobile-edge computing environment.

BACKGROUND

Traditionally, at the edge of a mobile network only specialist processing was performed. The edge of a mobile network housed specialized computing devices that were designed from the ground up to perform a function in the overall architecture and were not able to be repurposed. Connectivity from the edge of the mobile network back to the core was also a specific configuration, running over specialized protocols. The complete configuration was optimized in the pre smartphone era, where voice quality was the key driver in network design and before the days where IP was the standard for network communications. Currently, IP has spread from the internet, to enterprise networks and with widespread adoption of LTE, through the edge of networks to the end devices. This has enabled new applications to emerge that have seen a transformation in telecommunication networks and their design.

Mobile edge computing (MEC) brings traditional Information Technology (IT) infrastructure deep into the mobile network to the radio access network (RAN). MEC separates functionality from the underlying hardware infrastructure to increase mobile network flexibility, economy and scale. MEC empowers computational power into the mobile RAN, and it promotes virtualized software based ecosystems at the radio edge. The MEC platforms enable virtualized applications to run much closer to mobile users to boost the user experience.

With advancement in technology, integration of Internet of things (IoT) devices in the MEC environment has been implemented. Currently, large numbers of IoT sensor nodes are interconnected and generate voluminous data based on the characteristics of the participants in IoT sensor nodes. IoT sensor nodes have limited capacity, usually operating in a constrained wireless network. In addition, the IoT sensor nodes may act as the server in an IoT environment. It is difficult for MEC server to retrieve the necessary contextual information from the IoT sensor nodes in an MEC environment. Further, MEC server has to request and collect the information related to the type of IoT sensor nodes, device specification, type of data, utilization information, and the like, for each of the IoT sensor nodes. This increases the processing time as well as load not only at the IoT sensor nodes but also at the MEC to contextualize the information for radio-network and users. Thus, there is a need of a communication technique for managing the IoT ecosystem into the existing MEC infrastructure such that communication among various participants of the MEC infrastructure and the one or more IoT sensor nodes may be streamlined.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method for communication between one or more IoT sensor nodes associated with one or more IoT sensor devices, and one or more mobile edge computing (MEC) devices associated with one or more edge users. The method comprises defining, by a mobile edge computing (MEC) server, one or more business verticals and one or more dimensions associated with each of the one or more business verticals. The method further comprises identifying, by the MEC server, one or more operating modes associated with the one or more IoT sensor nodes based on the one or more dimensions, wherein each of the one or more operating modes are associated with one or more communication channels. The method further comprises receiving, by the MEC server, information captured by the one or more IoT sensor nodes associated with the one or more IoT sensor devices based on the identified one or more operating modes, via the associated one or more communication channels.

According to embodiments illustrated herein, there may be provided a MEC server for communication between one or more IoT sensor nodes associated with one or more IoT sensor devices, and one or more mobile edge computing (MEC) devices associated with one or more edge users. The MEC server comprises a processor and a memory communicatively coupled to the processor. The memory stores processor instructions, which, on execution, causes the processor to define one or more business verticals and one or more dimensions associated with each of the one or more business verticals. The processor may be further configured to identify one or more operating modes associated with the one or more IoT sensor nodes based on the one or more dimensions, wherein each of the one or more operating modes are associated with one or more communication channels. The processor may be further configured to receive information captured by the one or more IoT sensor nodes associated with the one or more IoT sensor devices based on the identified one or more operating modes, via the associated one or more communication channels.

According to embodiments illustrated herein, a non-transitory computer-readable storage medium having stored thereon, a set of computer-executable instructions for causing a computer comprising one or more processors to perform steps of defining one or more business verticals and one or more dimensions associated with each of the one or more business verticals. The one or more processors may be configured to identify one or more operating modes associated with one or more IoT sensor nodes based on the one or more dimensions, wherein each of the one or more operating modes are associated with one or more communication channels. The one or more processors may be configured to receive information captured by the one or more IoT sensor nodes associated with one or more IoT sensor devices based on the identified one or more operating modes, via the associated one or more communication channels.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
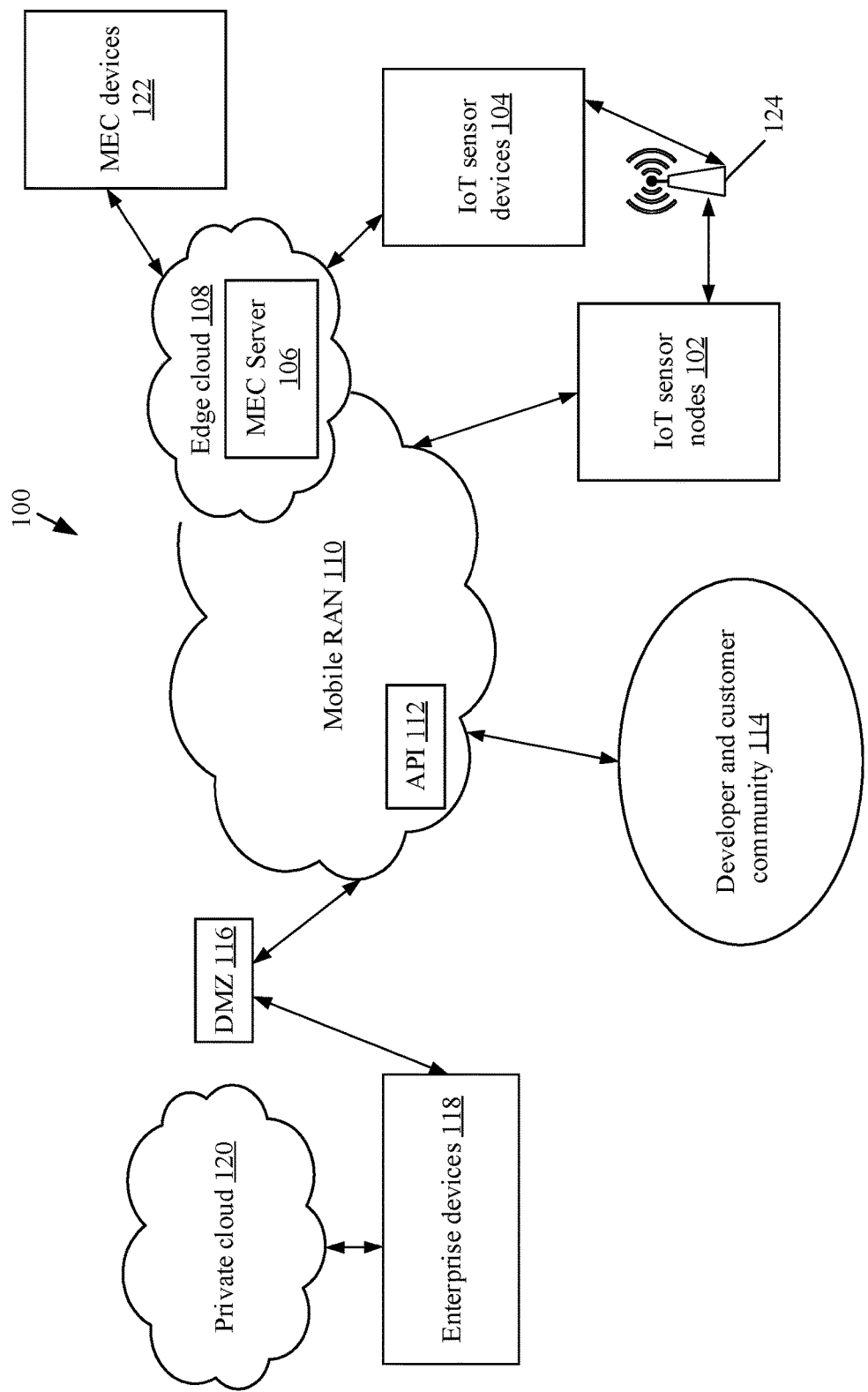
FIG. 1 is a diagram that illustrates a Mobile Edge Computing (MEC) environment in which various embodiments of the method and the system may be implemented.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions

The following terms may for example have, for the purposes of this application, the respective meanings set forth below. The glossary of terms described below relate to the conceptual, architectural and functional elements within the scope of work on Mobile Edge Computing.

Mobile Edge Computing (MEC) server may for example refer to a computing device that has the ability to run Information Technology (IT) services at the edge of mobile Radio Access Network (RAN) based on the concepts of cloud computing. The term "edge" in this context may for example mean the radio base station itself (eNodeB, RNC, etc.), and servers within the RAN (e.g. at "aggregation points"). The presence of MEC server at the edge of the RAN may allow exposure to real-time radio and network information (such as subscriber location, cell load, etc.) that can be leveraged by applications and services to offer context-related services to one or more edge users.

IoT sensor nodes may refer to devices that detects/measures events or changes in quantities and provides a corresponding output, generally as an electrical or optical signal. In an embodiment, one or more IoT sensor nodes may be connected to one or more IoT sensor devices via a communication media such as, the mobile RAN, a WiFi network, a wired network, and WiMAX. In medical science, the sensor may be operable to detect biological, physical, and/or chemical signals associated with first patient and may measure and record those signals. For example, pressure sensors, temperature sensors, and humidity sensors are used to monitor and regulate gas flow and gas conditions in Anesthesia Machines, Respirators and Ventilators.

IoT sensor devices may for example refer to a computer, a device including a processor/microcontroller and/or any other electronic component, device or a system that performs one or more operations according to one or more programming instructions. The one or more IoT sensor nodes may be communicatively coupled with the one or more IoT sensor devices via the mobile RAN. Examples of the IoT sensor devices include, but are not limited to, a desktop computer, a laptop, a personal digital assistant (PDA), a Smartphone, or the like. The computing device is capable of accessing (or being accessed over) a network (e.g., using wired or wireless communication capabilities)

Edge users may for example refer to users associated with the MEC devices. The edge users may utilize the MEC devices to subscribe to one or more edge services offered by the MEC server.

Mobile edge computing (MEC) devices may for example refer to a computer, a device including a processor/microcontroller and/or any other electronic component, device or system that performs one or more operations according to one or more programming instructions. Examples of the MEC device include, but are not limited to, a desktop computer, a laptop, a personal digital assistant (PDA), a Smartphone, or the like. The MEC device is capable of accessing (or being accessed over) a network (e.g., using wired or wireless communication capabilities).

Mobile edge application may for example refer to applications that can be instantiated on a MEC server within a mobile edge system and can potentially provide or consume mobile edge services. In an embodiment, one or more rules may be associated with the mobile edge application. The one or more rules may comprise at least required resources, maximum latency, traffic rules, Domain Name Server (DNS) rules, and mobility support.

MEC server level management may for example refer to components that handle the management of the functionalities of the MEC devices of a particular mobile edge platform, MEC server and the mobile edge applications running on the MEC server.

Mobile edge platform may for example refer to a collection of functionality that is required to run mobile edge applications on a virtualization infrastructure in a MEC server and to enable the MEC server to provide and consume mobile edge services.

Mobile edge service may for example refer to service provided via the mobile edge platform either by the mobile edge platform itself or by a mobile edge application.

Mobile edge system may for example refer to a collection of MEC servers to run mobile edge applications within a mobile RAN or a subset of the mobile RAN.

FIG. 1 is a diagram that illustrates a Mobile Edge Computing (MEC) environment 100 in which various embodiments of the method and the system may be implemented. Mobile-edge Computing (MEC) environment 100 offers application developers and content providers cloud-computing capabilities and an Information Technology (IT) service environment at the edge of mobile Radio Access Network (RAN) 110. Thus, the MEC environment 100 integrates the Information Technology (IT) and cloud-computing capabilities within the mobile Radio Access Network (RAN) 110.

The MEC environment 100 may include one or more IoT sensor nodes 102, one or more IoT sensor devices 104 associated with the one or more IoT sensor nodes 102, a MEC server 106, an edge cloud 108, a mobile Radio Access Network (RAN) 110, an Application Programming Interface (API) 112 associated with the mobile RAN 110, developer and customer community 114, a demilitarized zone (DMZ) 116, one or more enterprise devices 118, a private cloud 120, one or more Mobile edge computing (MEC) devices 122, and a communication network 124. The MEC server 106 may reside within the edge cloud 108 as represented in FIG. 1. The developer and customer community 114 may utilize the API 112 associated with the mobile RAN 110 to access information associated with the mobile RAN 110. Each of the one or more IoT sensor devices 104 may communicatively coupled to the one or more IoT sensor nodes 102, the MEC server 106 and the mobile RAN 110. In an embodiment, the one or more IoT sensor devices 104 may communicatively coupled to the one or more IoT sensor nodes 102 via the communication network 124.

In an embodiment, the one or more MEC devices 122 may be associated with one or more edge users. In an embodiment, one or more enterprise devices 118 in an enterprise may be communicatively coupled to the mobile RAN 110 via the DMZ 116. In an embodiment, the one or more enterprise devices 118 may be communicatively coupled to the private cloud 120 associated with the enterprise.

The one or more IoT sensor nodes 102 may refer to a device that detects/measures events or changes in quantities and provides a corresponding output, generally as an electrical or optical signal. In an embodiment, one or more IoT sensor nodes 102 may be connected to one or more IoT sensor devices 104 via the mobile RAN 110. In medical science, the sensor may be operable to detect biological, physical, and/or chemical signals associated with first patient and may measure and record those signals. For example, pressure sensors, temperature sensors, and humidity sensors are used to monitor and regulate gas flow and gas conditions in Anesthesia Machines, Respirators and Ventilators.

The one or more IoT sensor devices 104 refers to a computer, a device including a processor/microcontroller and/or any other electronic component, device or system that performs one or more operations according to one or more programming instructions. The one or more IoT sensor nodes 102 may be communicatively coupled with the one or more IoT sensor devices 104 via the mobile RAN 110. Examples of the IoT sensor devices 104 include, but are not limited to, a desktop computer, a laptop, a personal digital assistant (PDA), a Smartphone, or the like. The computing device is capable of accessing (or being accessed over) a network (e.g., using wired or wireless communication capabilities).

The MEC server 106 may refer to a computing device that has the ability to run Information Technology (IT) services at the edge of mobile Radio Access Network (RAN) 110 based on the concepts of cloud computing. The term "edge" in this context means the radio base station itself (eNodeB, Radio Network Controller (RNC), etc.), and servers within the mobile RAN 110 (e.g. at "aggregation points"). The MEC server 106 may be implemented at cellular base stations to provide flexible and rapid deployment of new applications and services for customers. The MEC server 106 may be considered as a cloud server running at the edge of the mobile RAN 110. The MEC server 106 may be configured to perform one or more specific tasks that cannot be achieved with the traditional network infrastructure. The MEC server 106 may be configured to enable applications and services to be hosted on top of the mobile network elements, i.e. above the network layer. The presence of MEC server 106 at the edge of the mobile RAN 110 allows exposure to real-time radio and network information (such as subscriber location, cell load, etc.) that can be leveraged by applications and edge services to offer context-related services to one or more edge users. In an embodiment, the edge cloud 108 refers to a cloud computing environment in which the MEC server 106 may be implemented. As the applications and services are implemented on the MEC server 106 that is at the edge of the mobile RAN 110, thus the applications and services are in close proximity to the customer. Hence, by running applications and performing related processing tasks closer to a cellular customer, network congestion is reduced and applications perform better.

In an embodiment, the one or more MEC devices 122 may be associated with one or more edge users. The one or more edge users may utilize the one or more MEC devices 122 to communicate with the MEC server 106 and subscribe to one or more services via the mobile RAN 110. The one or more MEC devices 122 refers to a computer, a device including a processor/microcontroller and/or any other electronic component, device or system that performs one or more operations according to one or more programming instructions. Examples of the MEC device include, but are not limited to, a desktop computer, a laptop, a personal digital assistant (PDA), a Smartphone, or the like. The MEC device is capable of accessing (or being accessed over) a network (e.g., using wired or wireless communication capabilities).

In an embodiment, the communication network 124 may be utilized to communicate the information captured by the one or more IoT sensor nodes 102 to the one or more IoT sensor devices 104. In an embodiment, one or more IoT sensor nodes 102 may communicate the information captured by the one or more IoT sensor nodes 102 to the one or more IoT sensor devices 104 via the communication network 124, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

In an embodiment, the mobile RAN 110 may correspond to a communication medium through which the one or more IoT sensor nodes 102, the one or more IoT sensor devices 104, the MEC server 106, and the one or more MEC devices 122 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G, 5G cellular communication protocols, and/or Bluetooth (BT) communication protocols.

In an embodiment, the API 112 may be accessible to the developer and customer community 114 to develop one or more edge services that may be run on the MEC server 106. In an embodiment, the one or more enterprise devices 118 in the enterprise may be communicatively coupled to the mobile RAN 110 via the DMZ 116. The DMZ 116 or demilitarized zone (sometimes referred to as a perimeter network) is a physical or logical subnetwork that contains and exposes an organization's external-facing services to an untrusted network, such as the Internet or the mobile RAN 110. The purpose of the DMZ 116 is to add an additional layer of security to an organization's local area network (LAN). In an embodiment, the one or more enterprise devices 118 may be communicatively coupled to the private cloud 120 associated with the enterprise. In an embodiment, the users of the one or more enterprise devices 118 may be enabled to subscribe to one or more edge services hosted by the MEC server 106. The communication between the one or more IoT sensor nodes 102 associated with the one or more IoT sensor devices 104, the one or more MEC devices 122 and the MEC server 106 has been discussed later in conjunction with FIG. 3.

The MEC environment 100 is characterized by ultra-low latency and high bandwidth as well as real-time access to mobile RAN information that can be leveraged by mobile edge applications. The MEC environment 100 may enable new vertical business segments and services for consumers and enterprise customers. Use cases of such services may comprise video analytics, location services, Internet-of-Things (IoT), augmented reality, optimized local content distribution, data caching.

MEC environment 100 enhances the mobile RAN 110 with MEC server 106 that enable applications to run in the mobile edge. Due to the proximity of the MEC server 106 into the mobile RAN 110, there is a latency reduction of delivering such applications or services. Such applications can expose information that can be used to optimize the network and services, reduce latency, and support creating personalized and contextualized services. In an embodiment, Internet of Things (TOT) applications or enterprise communications can benefit greatly from environment 100, as it allows service delivery in close proximity to the actual mobile edge devices such as, the one or more IoT sensor devices 104.

Figure 2:
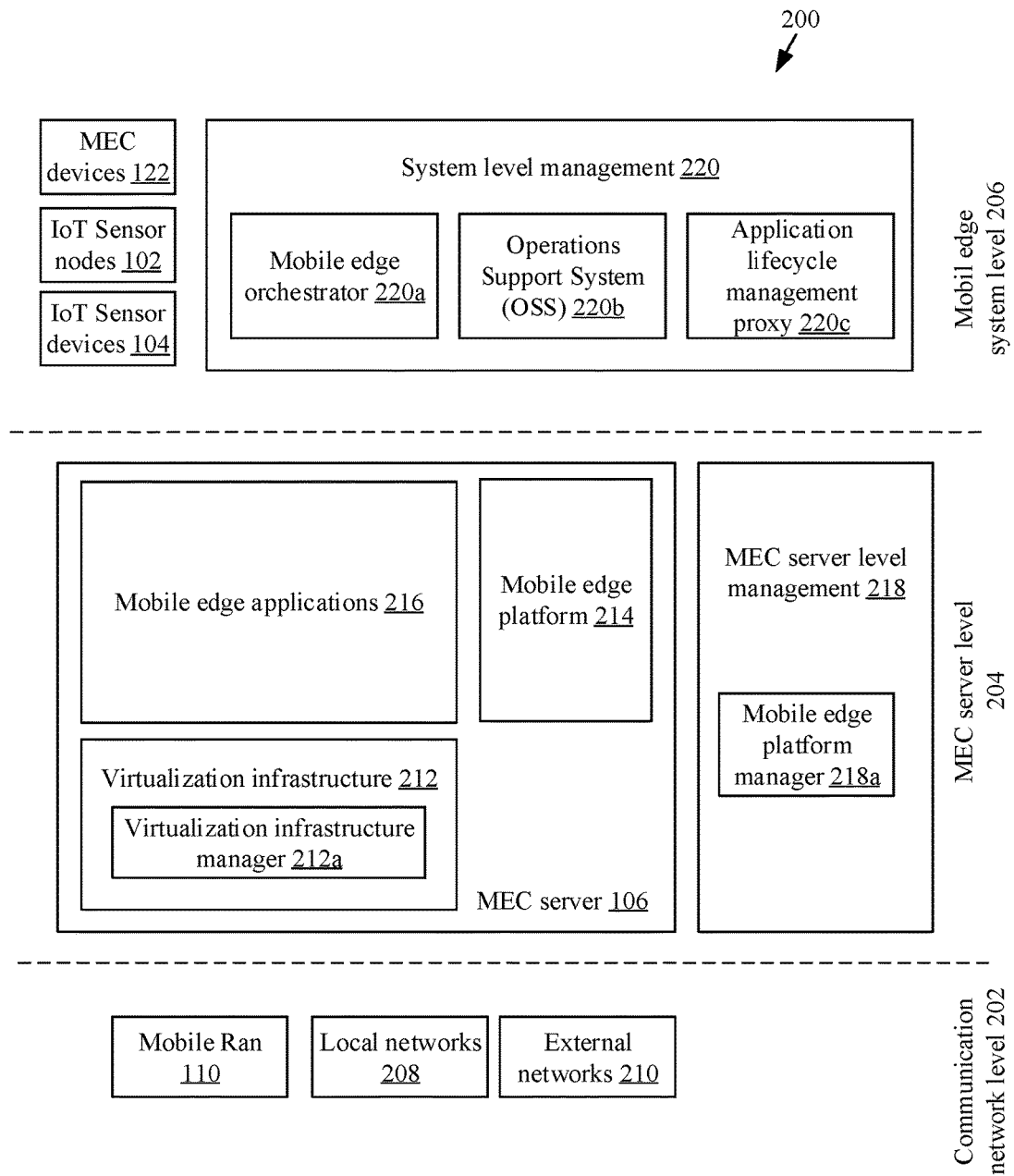
FIG. 2 is a block diagram that illustrates a Mobile Edge Computing framework that is configured to enable communication within the MEC environment, in accordance with some embodiments of the present disclosure.

FIG. 2 is a block diagram that illustrates a Mobile Edge Computing (MEC) framework 200 that is configured to enable communication within the MEC environment 100, in accordance with some embodiments of the present disclosure. In an embodiment, MEC environment 100 enables the implementation of mobile edge applications as software-only entities that run on top of a virtualization infrastructure, which is located in or close to the network edge based on the MEC framework 200. The MEC framework 200 is broadly divided into three levels viz. communication network level 202, a MEC server level 204, and a mobile edge system level 206. The communication network level 202 comprises different types of networks such as, the mobile RAN 110, local networks 208, and an external networks 210. The MEC server level 204 comprises a virtualization infrastructure (e.g. Network Functions Virtualization Infrastructure) 212, a mobile edge platform 214, one or more mobile edge applications 216, and MEC server level management 218. In an embodiment, the virtualization infrastructure 212, the mobile edge platform 214, and the one or more mobile edge applications 216 may be implemented in the MEC server 106. In an embodiment, the one or more mobile edge applications 216 may be implemented in the MEC server 106 may be implemented through virtual machines managed by the virtualization infrastructure 212. The mobile edge system level 206 comprises mobile edge system level management 220, one or more IoT sensor nodes 102, IoT sensor devices 104, and one or more MEC devices 122.

The MEC server 106 is an entity that contains the mobile edge platform 214 and the virtualization infrastructure 212 which provides compute, storage, and network resources for the one or more mobile edge applications 216. The virtualization infrastructure 212 includes a data plane that executes the traffic rules received by the mobile edge platform 214, and routes the traffic among applications, services, DNS server/proxy, mobile RAN 110, local networks 208 and external networks 210. Further, a virtualization infrastructure manager 212a may be configured to implement all the functions of the virtualization infrastructure 212.

The virtualization infrastructure manager 212a may be configured for allocating, managing and releasing virtualized (compute, storage and networking) resources of the virtualization infrastructure 212. The virtualization infrastructure manager 212a may prepare the virtualization infrastructure 212 to run a software image. The preparation includes configuring the virtualization infrastructure 212, and can include receiving and storing the software image. In an embodiment, virtualization infrastructure manager 212a may perform rapid provisioning of applications. The virtualization infrastructure manager 212a may be configured for collecting and reporting performance and fault information about the virtualized resources. In an embodiment, virtualization infrastructure manager 212a may perform application relocation. For application relocation from/to external cloud environments, the virtualization infrastructure manager 212a interacts with the external cloud manager to perform the application relocation.

The mobile edge platform 214 may be configured to provide an environment where the mobile edge applications may discover, advertise, consume and offer mobile edge services. The mobile edge platform 214 may be further configured to receive traffic rules from the mobile edge platform manager 218a, applications, or services, and instructing the data plane accordingly. In an embodiment, mobile edge platform 214 may be configured for translation of tokens representing the one or more MEC devices 122 associated with the one or more edge users in the traffic rules into specific IP addresses. In an embodiment, the mobile edge platform 214 may receive DNS records from the mobile edge platform manager 218a and may configure a DNS proxy/server based on the received DNS records. Further, the mobile edge platform 214 may be configured to host one or more mobile edge services.

The one or more mobile edge applications 216 may be running as virtual machines (VM) on top of the virtualization infrastructure 212 provided by the MEC server 106, and can interact with the mobile edge platform 214 to consume and provide one or more mobile edge services. In an embodiment, mobile edge applications can also interact with the mobile edge platform 214 to perform support procedures related to the lifecycle of the application, such as indicating availability, preparing relocation of user state, and the like. The one or more mobile edge applications 216 may have a certain number of rules and requirements associated to them, such as required resources, maximum latency, required or useful services, and the like. Such requirements may be validated by the mobile edge system level management 220, and can be assigned to default values if missing.

The MEC server level management 218 comprises the mobile edge platform manager 218a. The mobile edge platform manager 218a may be configured to manage the life cycle of applications including informing the mobile edge orchestrator of relevant application related events. The mobile edge platform manager 218a may be configured to provide element management functions to the mobile edge platform 214. Further, the application rules and requirements including service authorizations, traffic rules, DNS configuration and resolving conflicts may be configured by the mobile edge platform manager 218a. The mobile edge platform manager 218a also receives virtualized resources fault reports and performance measurements from the virtualization infrastructure manager for further processing.

The mobile edge system level management 220 comprises the mobile edge orchestrator 220a, Operations Support System (OSS) 220b and application lifecycle management proxy 220c. The mobile edge orchestrator 220a is the core functionality in mobile edge system level management 220. The mobile edge orchestrator 220a may be configured for maintaining an overall view of the mobile edge system based on deployed MEC servers 106, available resources, available mobile edge services, and topology. The mobile edge orchestrator 220a may be configured for validating application rules and requirements and if necessary adjusting them to comply with operator policies, keeping a record of on-boarded packages, and preparing the virtualization infrastructure manager 212a to handle the applications. The mobile edge orchestrator 220a may be configured for selecting appropriate MEC servers for application instantiation based on constraints, such as latency, available resources, and available services. The mobile edge orchestrator 220a may be configured for triggering mobile edge application instantiation and termination.

In an embodiment, the Operations Support System (OSS) 212b may receive requests from the MEC devices 122 for instantiation or termination of mobile edge applications. Operations Support System (OSS) 212b may decide on the granting of these requests. Granted requests are forwarded to the mobile edge orchestrator 220a for further processing. When supported, the OSS also receives requests from MEC devices 122 for relocating mobile edge applications between external clouds and the MEC server 106.

The mobile user application is a mobile edge application that is instantiated in the mobile edge system in response to a request of an edge user via an application running in the MEC device 122. The application lifecycle management proxy 220c allows MEC device 122 to request on-boarding, instantiation, termination of applications and when supported, relocation of applications in and out of the mobile edge system. The application lifecycle management proxy 220c authorizes requests from MEC device 122 and interacts with the OSS 212b and the mobile edge orchestrator 220a for further processing of these requests. The application lifecycle management proxy 220c is only accessible from within the mobile RAN 110.

Figure 3:
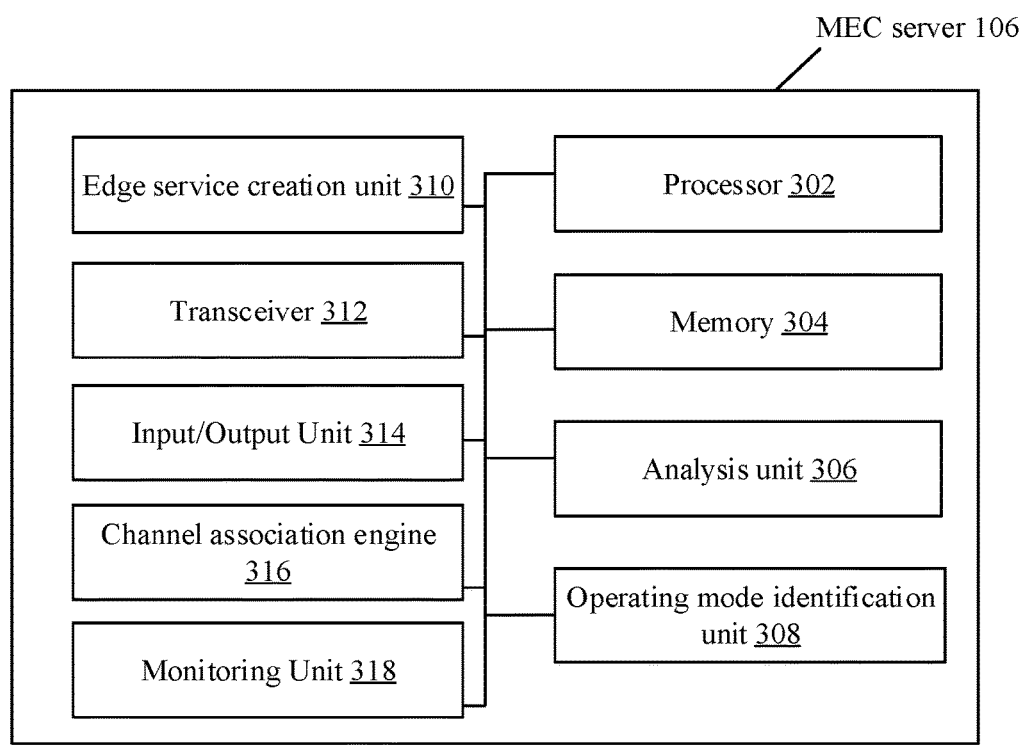
FIG. 3 is a block diagram of the Mobile Edge Computing (MEC) server that contains a mobile edge platform and a virtualization infrastructure which provides compute, storage, and network resources for one or more mobile edge applications, in accordance with some embodiments of the present disclosure.

FIG. 3 is a block diagram of the Mobile Edge Computing (MEC) server 106 that contains the mobile edge platform 214 and the virtualization infrastructure 212 which provides compute, storage, and network resources for one or more mobile edge applications 216, in accordance with some embodiments of the present disclosure. In an embodiment, the one or more mobile edge applications 216 may be associated with one or more one or more edge services. The MEC server 106 further comprises a processor 302, a memory 304, an analysis unit 306, an operating mode identification unit 308, an edge service creation unit 310, a transceiver 312, an input/output unit 314, the channel association engine 316, and the monitoring unit 318. The processor 302 may be communicatively connected to the memory 304, the analysis unit 306, the operating mode identification unit 308, the edge service creation unit 310, the transceiver 312, the input/output unit 314, the channel association engine 316, and the monitoring unit 318.

The processor 302 comprises suitable logic, circuitry, interfaces, and/or code that may be configured to execute a set of instructions stored in the memory 304. The processor 302 may be implemented based on a number of processor technologies known in the art. Examples of the processor 302 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 304 comprises suitable logic, circuitry, interfaces, and/or code that may be configured to store the set of instructions, which are executed by the processor 302. In an embodiment, the memory 304 may be configured to store one or more programs, routines, or scripts that may be executed in coordination with the processor 302. In an embodiment, the memory 304 may retain one or more predefined decision rules whether to accept or reject subscribe or unsubscribe request sent by one or more MEC devices 122. The memory 304 may be configured to store the monitoring information for the edge services and corresponding metadata associated with edge services. The memory 304 may be implemented based on a Random Access Memory (RAM), a Read-Only Memory (ROM), a Hard Disk Drive (HDD), a storage server, and/or a Secure Digital (SD) card.

The analysis unit 306 comprises suitable logic, circuitry, interfaces, and/or code that may be configured to define one or more business verticals and one or more dimensions associated with each of the one or more business verticals. The analysis unit 306 may be configured to extend the metadata to include one or more updates necessary to identify the one or more edge services and the one or more operating modes. The analysis unit 306 may be further configured to update the metadata based on an association between each of the one or more operating modes and the one or more communication channels. The analysis unit 306 may be further configured to monitor a change in the one or more business verticals and one or more dimensions. The analysis unit 306 may be further configured to update the one or more operating modes associated with the one or more IoT sensor nodes based on the monitoring.

The operating mode identification unit 308 comprises suitable logic, circuitry, interfaces, and/or code that may be configured to identify one or more operating modes associated with the one or more IoT sensor nodes based on the one or more dimensions. In an embodiment, each of the one or more operating modes are associated with one or more communication channels. The edge service creation unit 310 comprises suitable logic, circuitry, interfaces, and/or code that may be configured to create one or more edge services associated with the one or more communication channels for the one or more MEC devices based on the received information.

The transceiver 312 comprises of suitable logic, circuitry, interfaces, and/or code that may be configured to receive information captured by the one or more IoT sensor nodes associated with the one or more IoT sensor devices based on the identified one or more operating modes. The transceiver 312 may be further configured to receive a subscription request for one or more edge services associated with the one or more communication channels from the one or more MEC devices associated with the one or more edge users. The transceiver 312 may be further configured to transmit the information captured by the one or more IoT sensor nodes to the one or more MEC devices associated with the one or more edge users via the one or more communication channels based on the subscription request and the metadata in the one or more edge services. Thus, the transceiver 312 may communicate information between the one or more IoT sensor nodes and the one or more MEC devices associated with one or more edge users, via the mobile RAN 110. The transceiver 312 may implement one or more known technologies to support wired or wireless communication with the mobile RAN 110. In an embodiment, the transceiver 312 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 312 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The Input/Output (I/O) unit 314 comprises suitable logic, circuitry, interfaces, and/or code that may be configured to receive an input corresponding to the one or more business verticals and one or more dimensions associated with each of the one or more business verticals. The input/output unit 314 comprises of various input and output devices that are configured to communicate with the processor 302. Examples of the input devices include, but are not limited to, a keyboard, a mouse, a joystick, a touch screen, a microphone, and/or a docking station. Examples of the output devices include, but are not limited to, a display screen and/or a speaker.

In an embodiment, the channel association engine 316 comprises suitable logic, circuitry, interfaces, and/or code that may be configured to associate and dissociate the one or more communication channels to the identified one or more operating modes. In an embodiment, the monitoring unit 318 comprises suitable logic, circuitry, interfaces, and/or code that may be configured to monitor the created one or more edge services and the associated one or more communication channels.

In operation, the analysis unit 306 may be configured to define the one or more business verticals and the one or more dimensions associated with each of the one or more business verticals. Examples of the one or more business verticals may comprise at least one of smart grid, smart cars, smart healthcare and smart homes. For the purpose of explanation consider that the business vertical corresponds to a smart grid. The one or more dimensions correspond to a set of values associated with the business vertical. Every business vertical may have its own dimensions to utilize information generated by the one or more IoT sensor nodes 102. The analysis unit 306 may be configured to discover and place the one or more dimensions associated with the smart grid (business vertical). In an embodiment, the one or more dimensions correspond to the set of values obtained from the one or more IoT sensor nodes 102. In an embodiment, one or more dependencies associated with the one or more dimensions may be identified with respective business vertical (e.g. smart grid) and the other dimensions pertaining to the other business verticals. Further, evolving and interdependent dimensions are required to be managed and maintained in their correctness to effectively identify and utilize the one or more operating modes, as the one or more operating modes are highly dependent on the one or more dimensions. The example of dimensions for smart grid vertical are illustrated below:

Business Vertical:
Smart Grid
Value of Dimensions:
   1. Device: e.g., ERT Metering
   2. Location: e.g., County
   3. Premise: e.g., Residential
   4. Controls: e.g., Monitor
   5. Information: e.g., Present Meter reading+last meter reading
   6. Time: <present timestamp>

The example of dimensions for smart healthcare vertical are illustrated below:
Business Vertical:
Smart Healthcare
Value of Dimensions:

1. Product: e.g., Anesthesia Machines, Respirators, and Ventilators
2. Process: e.g., gas flow
3. Patient information: e.g., name, address, age, and, condition
4. Controls: e.g., monitor, higher, and lower
5. Time: <present timestamp>

After defining the one or more dimensions associated with the business vertical, the operating mode identification unit 308 may be configured to identify the one or more operating modes associated with the one or more IoT sensor nodes 102 based on the defined one or more dimensions. For example, the identified operating modes for the smart grid comprise Utilization, Status, Validation, Transaction, and Remote. In an embodiment, each of the one or more operating modes are associated with one or more communication channels. The one or more operating modes specify the information that may be to be transmitted across the one or more communication channels. Thus, the one or more operating modes decide what information needs to be sent across to the one or more communication channels. For example, the identified operating modes for the smart healthcare comprise condition, and quality. The condition operating mode provides the gas condition for the specific product whereas, quality operating mode provides present qualitative parameters of the product. The one or more operating modes are either a data entity or a set of data entities that represent factors impacting to rationalize the information communicated within the MEC environment 100.

However, the one or more operating modes may vary across multiple dimensions. Further, the one or more operating modes may be associated to that one or more dimensions that are identified and placed. For example, utilization is associated with the ERT metering and monitoring in the example of smart grid. Diversified business verticals can have similar or similar set of operating modes. In an embodiment, the one or more operating modes represent the dependencies among the one or more dimensions. In an embodiment, the correlations between the one or more operating modes and the one or more dimensions may be stored in the memory 304. The operating mode identification unit 308 may be configured to manage the operating mode configuration to correlate the one or more communication channels, IoT sensor nodes, and cross reference data to generate operating mode correspondence for channeling. In an embodiment, the change in the one or more dimensions may be based on the operating mode configuration and the correlation between one or more communication channels and the one or more operating modes.

In an embodiment, the channel association engine 316 may be configured to associate and dissociate the one or more communication channels to the identified one or more operating modes. A set of predefined channels may be utilized for specific operating modes. Thus, at least one communication channel may be associated with each of the one or more operating modes for transmitting the information to the MEC devices 122. In an embodiment, the change in the operating modes configuration may be performed based on IoT sensor nodes 102, correlation between one or more communication channels and the one or more operating modes, and cross reference data from various other participants of the MEC environment 100 including external resources such as environmental conditions impacting quality of transmission, vicinity information retrieved for the county, and the like.

After the configuration and identification of the one or more operating modes, the transceiver 312 may be configured to communicate the identified one or more operating modes to the one or more IoT sensor nodes 102. Based on the communicated one or more operating modes associated with each of the one or more IoT sensor nodes 102, each of the one or more IoT sensor nodes 102 may transmit the information captured by the one or more IoT sensor nodes in accordance with the communicated one or more operating modes. Thus, the one or more IoT sensor nodes 102 transmit the information captured by the one or more IoT sensor nodes 102 based on the one or more operating modes. The transceiver 312 may be configured to receive the information captured by the one or more IoT sensor nodes 102 associated with the one or more IoT sensor devices 104 based on the identified one or more operating modes, via the associated one or more communication channels. In an embodiment, the information comprises type of each of the one or more IoT sensor nodes, device specification of each of the one or more MEC devices, data captured by each of the one or more IoT sensor nodes, and type of data captured by each of the one or more IoT sensor nodes.

In response to the received information, the edge service creation unit 310 may be configured to create one or more edge services associated with the one or more communication channels for the one or more MEC devices based on the received information. In an embodiment, one or more retention policies may be defined and configured by the edge service creating unit 310 for each of the edge service during creation. The one or more edge services may comprise metadata of the one or more operating modes and the associated one or more communication channels. The metadata may comprise service identification number, a message sequence number, number of IoT sensor nodes, a channel number associated with each of the one or more communication channels, a serial number of the one or more IoT sensor nodes, and a timestamp. In an embodiment, one or more edge services may be created and formulated for the mobile edge applications 216. Such one or more edge services may be utilized by the one or more edge users of the specific business vertical. The developers the mobile edge applications 216 may utilize edge service creation unit 310 to develop and deploy services for the one or more communication channels. The one or more edge services may be a logical composition for sending and receiving the information via the communication channels. Each edge service name assigned to the edge service is unique and the edge service name may be associated with plurality of communication channels with the condition that same or subset of one or more operating modes are also associated with the one or more communication channels.

The edge service creation unit 310 may be further configured to manage the configuration of the MEC devices 122 associated with the edge users at the edge of mobile RAN 110. Further, the correlation between the edge users and their associated one or more edge services may be maintained by the edge service creation unit 310. Further, the edge service creation unit 310 may maintain the metadata associated with the communication channels in adherence to information captured by the IoT sensors nodes 102. In an embodiment, the memory 304 may be utilized to manage the correlation between MEC devices 122, edge services, the one or more communication channels, and the one or more operating modes.

The transceiver 312 may be configured to receive a subscription request for one or more edge services associated with the one or more communication channels from the one or more MEC devices 122 associated with the one or more edge users. In an embodiment, the transceiver 312 may be configured to receive an unsubscribe request for the one or more edge services to which the edge user may have already subscribed. In response to the received subscription/unsubscribe request, the processor 302 may validate subscription or unsubscribe request and sends acknowledgement in correspondence to the request by one or more MEC devices 122 indicating whether the subscription/unsubscribe request is accepted or rejected. The validation of the subscription or unsubscribe request may be performed based on the one or more predefined decision rules stored in the memory 304.

In response to the received subscription request, the transceiver 312 may be configured to transmit the information captured by the one or more IoT sensor nodes 102 to the one or more MEC devices 122 associated with the one or more edge users via the one or more communication channels based on the subscription request and the metadata in the one or more edge services. For example, for "Status" operating mode, transceiver 312 only sends status of the IoT sensor nodes 102. Thus, in an embodiment, the information associated with the subscription request for the one or more edge services associated with the one or more communication channels is transmitted via the one or more communication channels associated with the one or more edge services. Another critical action during transmission of the information may be to acquire qualitative measures including, however, not limited to security, connectivity, and signal-to-noise ratio. After receiving the information from the transceiver 312, in an embodiment, the one or more MEC devices may be configured to detect faults, and security issues associated with the received information.

Thus, based on the subscription request, the edge users may receive the desired information captured by the IoT sensors nodes 102 based on the identified operating modes. Thus, based on the mapping between the one or more edge users and the one or more subscription requests associated with the one or more edge services, the edge users receive the IoT information. In an embodiment, the transceiver 312 may be configured to transmit information to the MEC devices 122 based on the one or more operating modes associated with the one or more communication channel via the edge services. For example, for the smart healthcare business vertical, the transceiver 312 transmits the gas condition to specific communication channel associated with condition operating mode. The one or more MEC devices 122 may receive the information via the edge services and associated communication channel.

In an embodiment, the mapping can be updated or changed based on the type and requirements of the edge users. The one or more edge services may retain the metadata binding based on the one or more operating modes and the communication channel associated with that operating mode. Services can be created as more operating modes and associated communication channels are identified, however, the metadata remains consistent across services. Example of the metadata is the timestamp, sequence number, number of participant IoT sensor nodes, and IoT sensor device serial number. Such metadata that may remain consistent throughout one or more edge services may be utilized to transmit the relevant information to the edge users based on the identified operating mode. For example, a mobile edge application 216 may identify and associate the metadata to the services. The metadata may comprise IoT sensor node operating mode, mapping of IoT sensor node operating mode, source, communication channel, notification (from IoT), timestamp.

In an embodiment, the analysis unit 306 may be configured to extend the metadata to include one or more updates necessary to identify the one or more edge services and the one or more operating modes. In an embodiment, the metadata may be updated based on an association between each of the one or more operating modes and the one or more communication channels. In an embodiment, the association between the one or more operating modes and the one or more edge services associated with the one or more communication channels is determined based on the metadata.

The introduction, change, and update in the dimension results in change or identification of the one or more operating modes pertaining to the specific business. Even the interdependencies among the one or more dimensions needs to be reflect in the one or more operating modes. In an embodiment, the analysis unit 306 may be configured to continuously monitor a change in the one or more business verticals and the one or more dimensions. In an embodiment, the one or more operating modes associated with the one or more IoT sensor nodes may be updated based on the monitoring. In an embodiment, the analysis engine 306 may be configured to recognize additional business verticals or additional dimensions to existing business verticals has been introduced to the MEC environment 100. The additional business verticals may be introduced using the APIs 112 and the additional dimensions may be introduced with the facilitation of functionalities or services associated with the APIs 112. For example, the smart healthcare business vertical may have one or more API's configured to regulate gas flow and manage gas condition with specifically controlling pressure sensors, temperature sensors, and humidity sensors in anesthesia machines, respirators and ventilators. In this case, the dimensions and their values may be analyzed such as product (anesthesia machines, respirators, and ventilators), process (gas flow), patient information (name, address, age, and, condition) and control (monitor, higher, and lower). In an embodiment, different business verticals may utilize the same dimensions, however, different values may be associated with the dimensions. In an embodiment, the one or more business verticals and one or more dimensions associated with each of the one or more business verticals may be updated based on user inputs. In an embodiment, the updated business verticals and the dimensions may be communicated to the MEC devices 122 via the mobile RAN 110. In an embodiment, the transceiver 312 may be configured to broadcast a change/update or new association between the edge services, one or more communication channels, and one or more operating modes, to the MEC devices 122 based on the configuration of the MEC environment 100 and MEC devices 122 for receiving the broadcast messages.

The monitoring unit 318 may be configured to monitor the created one or more edge services and the associated one or more communication channels. The monitoring unit 318 may be configured to store runtime utilization of the one or more edge services and associated metadata in the memory 304. In an embodiment, the monitoring unit 318 may be enabled or disabled for a specific edge service. Further, based on the stored runtime utilization information of the one or more edge services and associated metadata, the processor 302 may be configured to generate one or more graphical visualizations that may depict the runtime utilization information of the one or more edge services.

Figure 4:
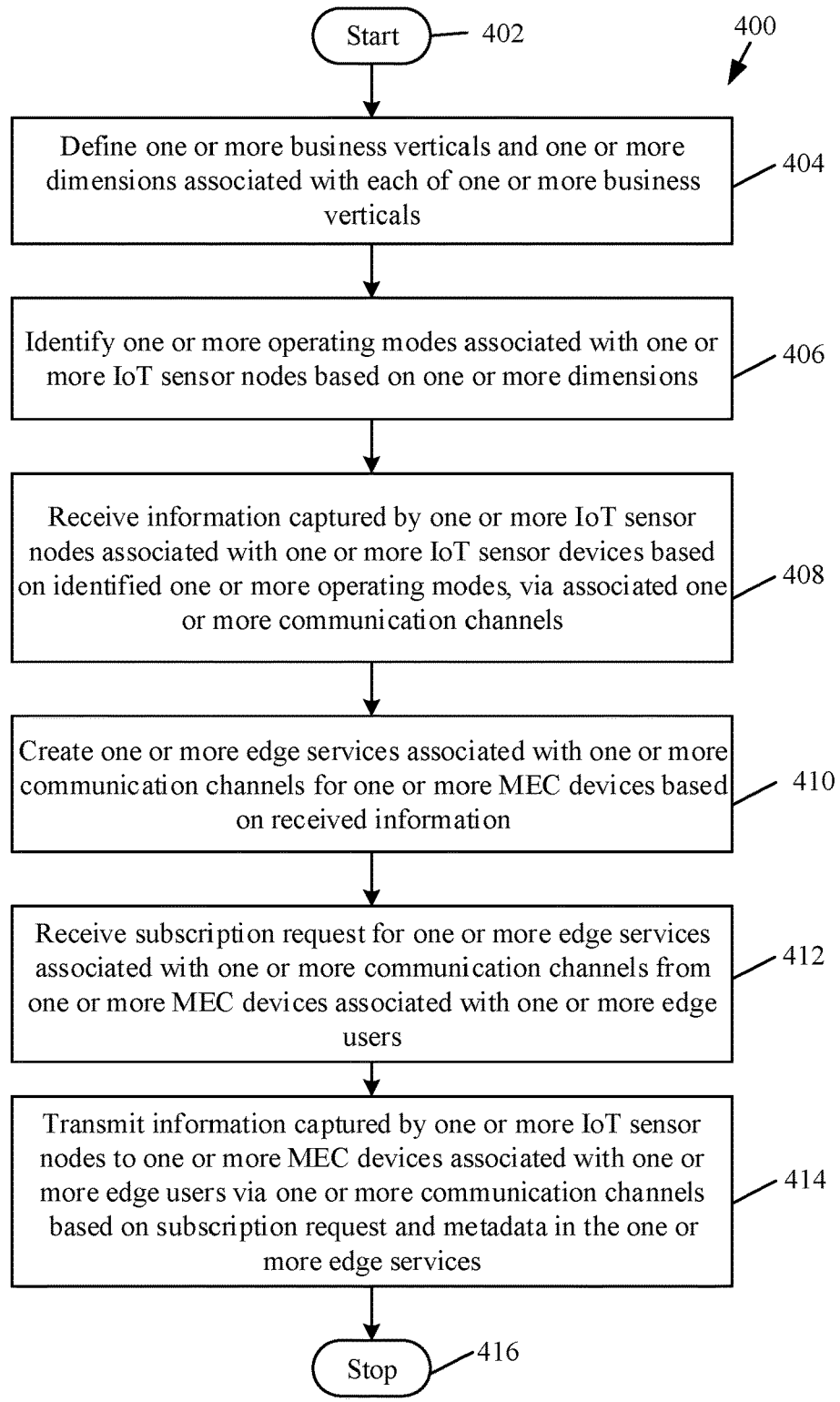
FIG. 4 is a flowchart illustrating a method for communication between one or more IoT sensor nodes associated with one or more IoT sensor devices, the MEC server, and one or more Mobile Edge Computing (MEC) devices, in accordance with some embodiments of the present disclosure.

FIG. 4 is a flowchart illustrating a method for communication between one or more IoT sensor nodes 102 associated with one or more IoT sensor devices 104, the MEC server 106, and one or more Mobile Edge Computing (MEC) devices 122, in accordance with some embodiments of the present disclosure.

The method starts at step 402 and proceeds to step 404. At step 404, the MEC server 106 may define one or more business verticals and one or more dimensions associated with each of the one or more business verticals. At step 406, the MEC server 106 may identify one or more operating modes associated with the one or more IoT sensor nodes 102 based on the one or more dimensions. In an embodiment, each of the one or more operating modes may be associated with one or more communication channels. At step 408, the MEC server 106 may receive information captured by the one or more IoT sensor nodes associated with the one or more IoT sensor devices based on the identified one or more operating modes, via the associated one or more communication channels. At step 410, the MEC server 106 may create one or more edge services associated with the one or more communication channels for the one or more MEC devices 122 based on the received information. In an embodiment, the one or more edge services may comprise metadata of the one or more operating modes and the associated one or more communication channels. At step 412, the MEC server 106 may receive a subscription request for one or more edge services associated with the one or more communication channels from the one or more MEC devices 122 associated with the one or more edge users. At step 414, the MEC server 106 may transmit the information captured by the one or more IoT sensor nodes 102 to the one or more MEC devices 122 associated with the one or more edge users via the one or more communication channels based on the subscription request and the metadata in the one or more edge services. Control passes to end step 416.

Example of a Computer System or Computer Apparatus

Figure 5:
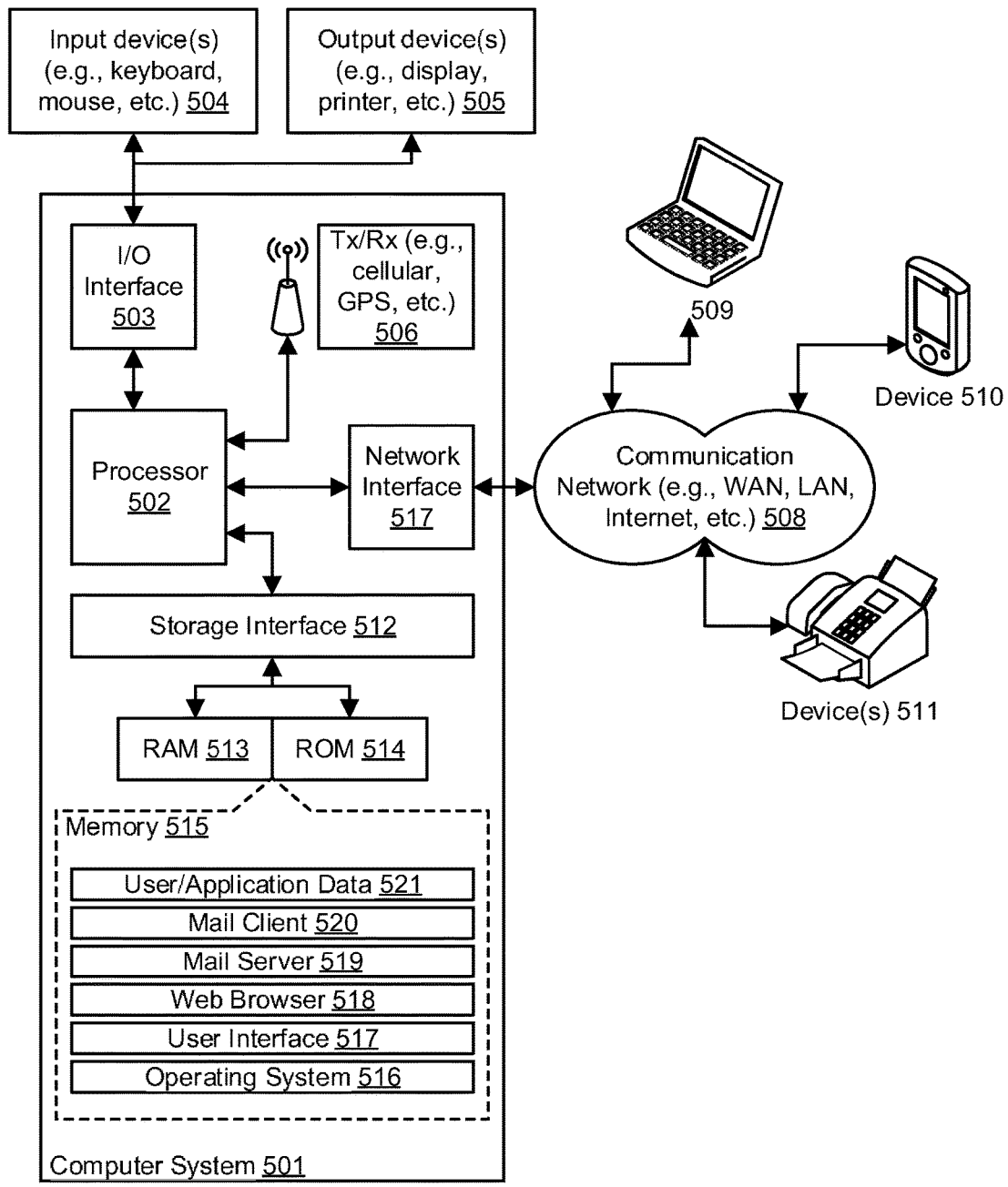
FIG. 5 illustrates a block diagram of an exemplary computer system for implementing embodiments consistent with the present disclosure.

FIG. 5 illustrates a block diagram of an exemplary computer system or apparatus for implementing embodiments consistent with examples illustrated an described in the present disclosure. Variations of computer system 501 may be used for communication between one or more IoT sensor nodes 102 associated with one or more IoT sensor devices 104, the MEC server 106, and one or more Mobile Edge Computing (MEC) devices 122. The computer system 501 may correspond to MEC server 106. The computer system 501 may comprise a central processing unit ("CPU" or "processor") 502. Processor 502 may comprise at least one data processor for executing program components for executing user- or system-generated requests. A user may include a person, a person using a device such as such as those included in this disclosure, or such a device itself. The processor 502 may include specialized processing units such as integrated system (bus) controllers, memory management control units, floating point units, graphics processing units, digital signal processing units, etc. The processor 502 may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver 506 may facilitate various types of wireless transmission or reception. For example, the transceiver 506 may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface 507 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server 519 may be an Internet mail server such as Microsoft Exchange, or the like. The mail server 519 may utilize facilities such as ASP, ActiveX, ANSI C++/C#, Microsoft .NET, CGI scripts, Java, JavaScript, PERL, PHP, Python, WebObjects, etc. The mail server 519 may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Figure 6:
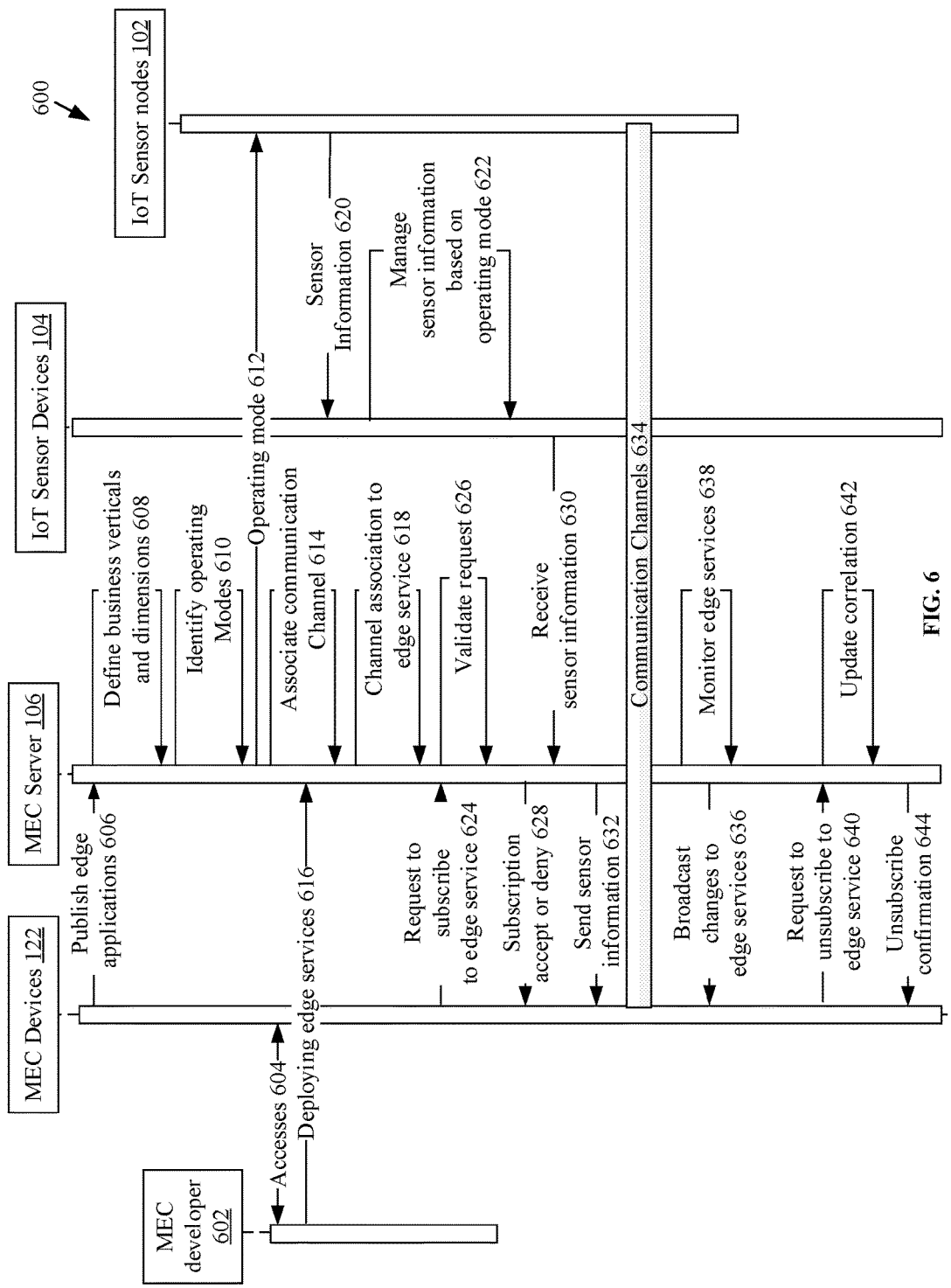
FIG. 6 illustrates an interaction diagram between the various entities involved in the communication in the MEC environment, in accordance with some embodiments of the present disclosure.

FIG. 6 illustrates an interaction diagram 600 between the various entities involved in the communication in the MEC environment 100, in accordance with some embodiments of the present disclosure.

Referring to FIG. 6, the various entities involved in the communication in the MEC environment 100 are an MEC developer 602, MEC devices 122, MEC server 106, IoT sensor nodes 102, and IoT sensor devices 104. Step 604 illustrates that the MEC developer may have access to the MEC devices one or more edge applications 216. Step 606 illustrates that the MEC devices 122 may send a request to the MEC server 106 to publish one or more edge applications 216. Step 608 illustrates that the MEC server 106 may define one or more business verticals and one or more dimensions associated with each of the one or more business verticals. Step 610 illustrates that the MEC server 106 may identify one or more operating modes associated with the one or more IoT sensor nodes 102 based on the one or more dimensions. Step 612 illustrates that the MEC server 106 may communicate the identified operating mode to the one or more IoT sensor nodes 102.

Step 614 illustrates that the MEC server 106 may associate one or more communication channels to each of the one or more operating modes. Step 616 illustrates that the MEC developer 602 may deploy one or more edge services at the MEC server 106. Step 618 illustrates that the MEC server 106 may associate one or more communication channels to each of the one or more edge services. Step 620 illustrates that the IoT sensor nodes 102 may transmit the captured sensor information to the IoT devices 104. Step 622 illustrates that IoT devices 104 may be configured to manage sensor information based on the one or more operating modes.

Step 624 illustrates that one or more MEC devices 122 may send a request to the MEC server 106 for subscribing to an edge service. Step 626 illustrates that in response to the received subscription request, the MEC server may validate the subscription request based on the one or more predefined decision rules stored in the memory 304. Step 628 illustrates that based on the validation performed by the MEC server 106, the MEC server may either accept or deny the subscription request and communicate the same accordingly to the MEC devices 122. Step 630 illustrates that the MEC server may receive the sensor information captured by the IoT sensor nodes 102 from the IoT sensor devices 104 in accordance with the identified one or more operating modes. Step 632 illustrates that the MEC server 106 may transmit the sensor information to the MEC devices 122 in accordance with the identified one or more operating modes. In an embodiment, one or more communication channels 634 may be associated with the MEC devices 122, the MEC server 106, IoT sensor devices 104, and IoT sensor nodes 102. Each of the one or more communication channels 634 may be associated with one or more operating modes.

Step 636 illustrates that the updates/changes in the edge services may be broadcasted by the MEC server 106. Step 638 illustrates that the MEC server 106 may be configured to monitor each of the one or more edge services to determine the utilization of each edge service. Step 640 illustrates that one or more MEC devices 122 may send a request to the MEC server 106 for unsubscribing to an edge service. Step 642 illustrates that in response to the unsubscribe request, the MEC server 106 may be configured to update the correlation between the edge service and the MEC devices 122. Step 644 illustrates that after updating the correlation, the MEC server 106 may transmit an unsubscribe confirmation to the MEC devices 122.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Examples of Advantages May Include

The disclosed method described herein streamlines the communication between one or more IoT sensor nodes 102 associated with one or more IoT sensor devices 104, and one or more mobile edge computing (MEC) devices 122 associated with one or more edge users. Below are a few advantages of the disclosed method.

1. Reduced high signaling overhead from tunneling and binding operations which consequently reduces processing at every stage and saves energy consumption.

2. Simplified communication between MEC devices and IoT sensor nodes.

3. Modification of the IoT sensor infrastructure, interoperability and accessibility to MEC environment, and connectivity and communication to sensor nodes can be rationalized.

4. Edge user management and configuration can be performed independently and within the context of desired IoT related information required for the applications that edge users are participating or offering.

5. Metadata at the MEC devices can be utilized to retrieve through statistics and understanding of the IoT utilization.

6. Communication channels can be independently configured and request to retrieve information from IoT sensor nodes. They can be managed within the MEC environment.

7. Mobile operators can open up the radio network edge to third-party partners, allowing them to rapidly deploy innovative applications and edge services towards mobile subscribers, enterprises and other vertical segments.

8. For application developers and content providers, MEC server at the edge of the mobile RAN offers edge service creation and management environment with ultra-low latency and high bandwidth as well as direct access to real-time radio and network information.

9. Mobile-Edge Computing allows IoT information, edge services and applications to be accelerated, increasing responsiveness from the edge. The customer experience can be proactively maintained through efficient network and service operations, based on insight into the radio and network conditions.

10. Network vendors and technology providers can provide mobile RAN equipment and base stations enhanced with cloud computing capabilities, by offering more powerful and flexible network elements able to satisfy the increasing needs of the communication world.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for communication between one or more IoT sensor nodes associated with one or more IoT sensor devices, and one or more mobile edge computing (MEC) devices associated with one or more edge users, the method comprising:
   defining, by a mobile edge computing (MEC) server, one or more business verticals and one or more dimensions associated with each of the one or more business verticals, each of the one or more business verticals comprises one of a plurality of business market categories and each of the one or more dimensions comprises a value associated with each of the one or more business verticals;
   identifying, by the MEC server, one or more operating modes associated with the one or more IoT sensor nodes based on the one or more dimensions, wherein each of the one or more operating modes are associated with one or more communication channels;
   receiving, by the MEC server, information captured by the one or more IoT sensor nodes associated with the one or more IoT sensor devices based on the identified one or more operating modes, via the associated one or more communication channels;
   creating, by the MEC server, one or more edge services associated with the one or more communication channels for the one or more MEC devices based on the received information, wherein the created one or more edge services comprise metadata of the one or more operating modes and the associated one or more communication channels, wherein the metadata comprises one or more of a service identification number, a message sequence number, a number of IoT sensor nodes, a channel number associated with each of the one or more communication channels, a serial number of the one or more IoT sensor nodes, or a timestamp; and
   providing, by the MEC server, a subscription offer for the created one or more edge services to the one or more MEC devices.

2. The method of claim 1, further comprising extending the metadata to include one or more updates necessary to identify the one or more edge services and the one or more operating modes.

3. The method of claim 1, further comprising updating the metadata based on an association between each of the one or more operating modes and the one or more communication channels.

4. The method of claim 3, wherein the association between the one or more operating modes and the one or more edge services associated with the one or more communication channels is determined based on the metadata.

5. The method of claim 1, further comprising receiving a subscription request for one or more edge services associated with the one or more communication channels from the one or more MEC devices associated with the one or more edge users.

6. The method of claim 5, further comprising transmitting the information captured by the one or more IoT sensor nodes to the one or more MEC devices associated with the one or more edge users via the one or more communication channels based on the subscription request and the metadata in the one or more edge services, wherein the information associated with the subscription request for the one or more edge services associated with the one or more communication channels is transmitted via the one or more communication channels associated with the one or more edge services.

7. The method of claim 1, further comprising
   monitoring a change in the one or more business verticals and one or more dimensions; and
   updating the one or more operating modes associated with the one or more IoT sensor nodes based on the monitoring.

8. The method of claim 1, further comprising communicating the identified one or more operating modes to the one or more IoT sensor nodes.

9. The method of claim 1, wherein the one or more dimensions correspond to a set of values obtained from the one or more IoT sensor nodes, wherein the one or more dimensions are specific to each of the one or more business verticals, and wherein the one or more business verticals comprise at least one of smart grid, smart healthcare, smart cars, or smart homes.

10. The method of claim 1, wherein the one or more operating modes specify the information that is to be transmitted across the one or more communication channels.

11. The method of claim 1, wherein the information comprises type of each of the one or more IoT sensor nodes, device specification of each of the one or more MEC devices, data captured by each of the one or more IoT sensor nodes, and type of data captured by each of the one or more IoT sensor nodes.

12. The method of claim 1, wherein the one or more IoT sensor nodes transmit the information captured by the one or more IoT sensor nodes based on the one or more operating modes.

13. The method of claim 1, further comprising updating the one or more business verticals and one or more dimensions associated with each of the one or more business verticals based on user inputs.

14. A mobile edge computing (MEC) server configured to communicate between one or more IoT sensor nodes associated with one or more IoT sensor devices, and one or more mobile edge computing (MEC) devices associated with one or more edge users, the MEC server comprising
   a processor; and
   a memory communicatively coupled to the processor, wherein the memory stores processor instructions, which, on execution, causes the processor to:
      define one or more business verticals and one or more dimensions associated with each of the one or more business verticals, each of the one or more business verticals comprises one of a plurality of business market categories and each of the one or more dimensions comprises a value associated with each of the one or more business verticals;
      identify one or more operating modes associated with the one or more IoT sensor nodes based on the one or more dimensions, wherein each of the one or more operating modes are associated with one or more communication channels;
      receive information captured by the one or more IoT sensor nodes associated with the one or more IoT sensor devices based on the identified one or more operating modes, via the associated one or more communication channels;
      create one or more edge services associated with the one or more communication channels for the one or more MEC devices based on the received information, wherein the created one or more edge services comprise metadata of the one or more operating modes and the associated one or more communication channels, wherein the metadata comprises one or more of a service identification number, a message sequence number, a number of IoT sensor nodes, a channel number associated with each of the one or more communication channels, a serial number of the one or more IoT sensor nodes, or a timestamp; and provide a subscription offer for the created one or more edge services to the one or more MEC devices.

15. The MEC server of claim 14, wherein the processor is further configured to extend the metadata to include one or more updates necessary to identify the one or more edge services and the one or more operating modes.

16. The MEC server of claim 14, wherein the processor is further configured to update the metadata based on an association between each of the one or more operating modes and the one or more communication channels.

17. The MEC server of claim 16, wherein the association between the one or more operating modes and the one or more edge services associated with the one or more communication channels is determined based on the metadata.

18. The MEC server of claim 14, wherein the processor is further configured to receive a subscription request for one or more edge services associated with the one or more communication channels from the one or more MEC devices associated with the one or more edge users.

19. The MEC server of claim 18, wherein the processor is further configured to transmit the information captured by the one or more IoT sensor nodes to the one or more MEC devices associated with the one or more edge users via the one or more communication channels based on the subscription request and the metadata in the one or more edge services, wherein the information associated with the subscription request for the one or more edge services associated with the one or more communication channels is transmitted via the one or more communication channels associated with the one or more edge services.

20. A non-transitory computer-readable storage medium having stored thereon, a set of computer-executable instructions for causing a computer comprising one or more processors to perform steps comprising:

defining one or more business verticals and one or more dimensions associated with each of the one or more business verticals, each of the one or more business verticals comprises one of a plurality of business market categories and each of the one or more dimensions comprises a value associated with each of the one or more business verticals;

identifying one or more operating modes associated with one or more IoT sensor nodes based on the one or more dimensions, wherein each of the one or more operating modes are associated with one or more communication channels;

receiving information captured by the one or more IoT sensor nodes associated with one or more IoT sensor devices based on the identified one or more operating modes, via the associated one or more communication channels creating one or more edge services associated with the one or more communication channels for the one or more MEC devices based on the received information, wherein the created one or more edge services comprise metadata of the one or more operating modes and the associated one or more communication channels, wherein the metadata comprises one or more of a service identification number, a message sequence number, a number of IoT sensor nodes, a channel number associated with each of the one or more communication channels, a serial number of the one or more IoT sensor nodes, or a timestamp; and providing a subscription offer for the created one or more edge services to the one or more MEC devices.

* * * * *